(12) United States Patent
Krippner et al.

(10) Patent No.: US 12,492,760 B2
(45) Date of Patent: Dec. 9, 2025

(54) METHOD OF OPERATING A DIAPHRAGM VALVE AND DIAPHRAGM VALVE

(71) Applicant: BUERKERT WERKE Gmbh & CO. KG, Ingelfingen (DE)

(72) Inventors: Peter Krippner, Ingelfingen (DE);
Sagar Agarwal, Ingelfingen (DE);
Franziska Maier, Ingelfingen (DE)

(73) Assignee: BUERKERT WERKE GMBH & CO. KG, Ingelfingen (DE)

( * ) Notice: Subject to any disclaimer, the term of this patent is extended or adjusted under 35 U.S.C. 154(b) by 0 days.

(21) Appl. No.: 18/469,058

(22) Filed: Sep. 18, 2023

(65) Prior Publication Data
US 2024/0102578 A1 Mar. 28, 2024

(30) Foreign Application Priority Data

Sep. 26, 2022 (DE) .......................... 102022124706.6

(51) Int. Cl.
*F16K 37/00* (2006.01)
*F16K 7/12* (2006.01)
(Continued)

(52) U.S. Cl.
CPC .......... *F16K 37/0083* (2013.01); *F16K 7/126* (2013.01); *F16K 7/16* (2013.01); *F16K 7/17* (2013.01); *F16K 37/0041* (2013.01); *F16K 37/005* (2013.01); *G06N 3/02* (2013.01); *G06N 3/047* (2023.01); *G06N 3/049* (2013.01); *G06N 3/063* (2013.01); *G06N 3/08* (2013.01); *G06N 5/02* (2013.01); *G06N 5/022* (2013.01);
(Continued)

(58) Field of Classification Search
CPC ............. F16K 37/0041; F16K 37/0083; F16K 37/005; F16K 7/17; F16K 7/126; G06N 20/00; G06N 3/08; G06N 3/084; G06N 7/01; G06N 3/047; G06N 3/02; G06N 20/10; G06N 5/046; G06N 3/049; G06N 5/02; G06N 5/022; G06N 3/063
See application file for complete search history.

(56) References Cited

U.S. PATENT DOCUMENTS

2005/0092079 A1* 5/2005 Ales ..................... F16K 31/1221
73/270
2010/0205607 A1* 8/2010 Shivanna ............ G06F 11/0715
718/103
(Continued)

*Primary Examiner* — Atif H Chaudry
(74) *Attorney, Agent, or Firm* — McNees Wallace & Nurick (57) ABSTRACT

A method of operating a diaphragm valve is specified. The diaphragm valve comprises a fluid housing having a valve seat formed therein, a diaphragm which cooperates with the valve seat to open or close a flow path through the fluid housing, and at least two sensors from the following group: a capacitive sensor, which is arranged such that the diaphragm is located at least in sections in the electric field of the capacitive sensor, a temperature sensor, a pressure sensor, a force sensor, a pH sensor, a stress sensor and a vibration sensor, wherein an index value is formed from the measured values of the different sensors by means of a data fusion algorithm at at least two points in time, wherein a degree of wear of the diaphragm is determined on the basis of a change in the index value. Furthermore, a diaphragm valve is specified.

13 Claims, 4 Drawing Sheets

(51) Int. Cl.

| | |
|---|---|
| *F16K 7/16* | (2006.01) |
| *F16K 7/17* | (2006.01) |
| *G06N 3/02* | (2006.01) |
| *G06N 3/047* | (2023.01) |
| *G06N 3/049* | (2023.01) |
| *G06N 3/063* | (2023.01) |
| *G06N 3/08* | (2023.01) |
| *G06N 5/02* | (2023.01) |
| *G06N 5/022* | (2023.01) |
| *G06N 5/046* | (2023.01) |
| *G06N 7/01* | (2023.01) |
| *G06N 20/00* | (2019.01) |
| *G06N 20/10* | (2019.01) |

(52) U.S. Cl.
CPC ............... *G06N 5/046* (2013.01); *G06N 7/01* (2023.01); *G06N 20/00* (2019.01); *G06N 20/10* (2019.01)

(56) References Cited

U.S. PATENT DOCUMENTS

| | | | | |
|---|---|---|---|---|
| 2018/0349434 A1* | 12/2018 | Seidel | ................. | G06F 16/2365 |
| 2019/0145722 A1* | 5/2019 | Myers | ....................... | C02F 1/00 |
| 2020/0263796 A1* | 8/2020 | Veto | ................... | F16K 31/1266 |

* cited by examiner

METHOD OF OPERATING A DIAPHRAGM VALVE AND DIAPHRAGM VALVE

TECHNICAL FIELD

The disclosure relates to a method of operating a diaphragm valve and to a diaphragm valve.

BACKGROUND

In diaphragm valves, wear phenomena usually occur in the diaphragm over time, for example, degradation or thinning of the material, a change in geometry or cracks, which can negatively affect the properties of the diaphragm or lead to leakage. Such wear phenomena are favored in part by the conditions prevailing during operation of the diaphragm valve, such as temperature, pressure and flow rate. When dosing acids or other aggressive chemicals or gases, it is possible, considered over a longer period of time, for the material of the diaphragm to be attacked by the media used.

It is therefore necessary to replace the diaphragm regularly.

However, since the diaphragm is not accessible without disassembling the valve, it is difficult to obtain information about a state of the diaphragm during operation and to reliably predict a remaining residual service life.

The present disclosure provides a means of detecting the state of a diaphragm in a diaphragm valve, taking various influencing parameters into account.

SUMMARY

According to the disclosure, a method of operating a diaphragm valve is provided, the diaphragm valve comprising a fluid housing having a valve seat formed therein, a diaphragm which cooperates with the valve seat to open or close a flow path through the fluid housing, at least two sensors from the following group: a capacitive sensor, which is arranged such that the diaphragm is located at least in sections in the electric field of the capacitive sensor, a temperature sensor, a pressure sensor, a force sensor, a pH sensor, a stress sensor and a vibration sensor. An index value is formed from the measured values of the different sensors by means of a data fusion algorithm at at least two points in time, wherein a degree of wear of the diaphragm is determined on the basis of a change in the index value.

Consequently, by evaluating the output values of the sensors, a state of the diaphragm can be estimated without having to inspect the diaphragm itself.

The disclosure takes advantage of the fact that, under the same conditions, the values measured by the various sensors repeat in the same manner when the diaphragm valve is actuated.

As the diaphragm wears, changes in conformity, in the conductivity of the diaphragm material, or pressure changes due to cracks occur, which lead to a change in the values measured by the sensors. According to the disclosure, these changes are included into the index value and are used to make a prediction about the lifetime of the diaphragm.

In addition, high temperatures or temperature fluctuations, a high fluid pressure, high forces acting on the diaphragm or stresses occurring in the diaphragm, contact with aggressive media and/or vibrations in the diaphragm valve promote wear of the diaphragm.

The different sensors can be arranged such that the measured values allow conclusions to be drawn about a state of the diaphragm. For example, the sensors are arranged in contact with the diaphragm or in the vicinity of the diaphragm.

For the capacitive sensor, the diaphragm represents e.g. a capacitor plate, so that the capacitive sensor reacts to movements and material changes of the diaphragm. Movements and material changes of the diaphragm can be measured e.g. as an output signal of the capacitive sensor. Each change of the diaphragm changes the capacitance value of the sensor.

Optionally, an area of the diaphragm which is deflected when the diaphragm valve is actuated is completely located in the electric field of the capacitive sensor. This contributes to a particularly accurate measurement result.

The deflected area of the diaphragm has no contact with the sensor.

The more different sensors are taken into account to form the index value, the more reliably wear of the diaphragm can be determined on the basis of the index value.

The index value can be a dimensionless value which reflects a state of the diaphragm.

Wear is understood to mean the occurrence of cracks, irreversible changes in geometry, material degradation or a thinning of the material, etc.

A new index value may be respectively formed at fixed time intervals, the time intervals being in particular constant.

Alternatively, it is conceivable to form a new index value when the measured value of one of the sensors changes.

The degree of wear can be determined based on the index value by comparing the formed index value with values stored in a lookup table. The stored values have been determined, for example, individually for specific diaphragm types and/or valve types by means of tests. It is also conceivable that the stored values have been determined by means of simulations. Alternatively, the stored values may be based on values already measured in connection with a replaced diaphragm.

In accordance with the data fusion algorithm, the measured values of the different sensors can be included in the index value with a defined weighting. In other words, the measured values of the different sensors can be weighted differently. The weighting reflects the influence of the measured value on the wear. The weighting can additionally improve the reliability of the determination of the wear based on the index value.

It is conceivable that the weighting of individual measured values is different for different cases of application. For example, the measured value of the pH sensor is weighted more heavily when an aggressive medium such as acid is used than when water is used, since an aggressive medium is more conducive to wear. The measured value of the temperature sensor is also weighted more heavily, for example, when an aggressive medium is used, since high temperatures can further increase the aggressiveness of a medium.

In addition, a variable weighting is also conceivable, i.e., the weighting of individual measured values is changed in the course of operation. In this way, it is taken into account that the influence of certain parameters on the wear of the diaphragm changes when a certain amount of wear has already taken place. For example, the weighting of the measured values of the pressure sensor, the force sensor and/or the stress sensor is increased if a certain wear of the diaphragm has already taken place. Furthermore, the weighting of a measured value can be changed if the measured value changes significantly, for example, if a temperature increases sharply or a pressure drops sharply, etc. Such abrupt changes may indicate premature diaphragm failure.

The individual measured values can each be multiplied by their own weighting factor, the sum of the weighting factors being limited to a defined value, for example to the value 1. A higher weighting of a value thus automatically results in a lower weighting of the remaining values, which additionally strengthens the effect of the weighting.

For example, in accordance with the data fusion algorithm, a mean value is respectively formed from the measured values of the different sensors, and the differently weighted mean values are added up to form the index value. The mean value can be formed from the measured values from the beginning of the measurement or from the measured values since the last time the index value was formed. By forming a mean value, it is taken into account that not all sensors necessarily provide new values at the same time intervals. In other words, the sensors may provide new values synchronously or asynchronously.

According to one aspect, a weighted arithmetic mean of the sensor values is formed.

For example, the sensors provide discrete-time measured values. In this way, the amount of data to be evaluated is limited or the evaluation of the data is simplified. In particular, if a new index value is respectively formed at fixed time intervals, discrete-time measured values are sufficient.

According to one aspect, when the diaphragm is replaced, an initial index value is formed which reflects a new state of the diaphragm, wherein the index values formed later are compared with the initial index value, and a degree of wear of the diaphragm is determined based on a deviation of an index value from the initial index value. By comparison with the initial index value, a degree of wear of the diaphragm can be determined particularly easily.

By repeatedly forming the index value at fixed time intervals, it can be estimated in advance on the basis of a development of the index value when it is advisable to replace the diaphragm. In this way, any necessary maintenance can be better planned.

For example, a maximum value for the index value is defined, a replacement of the diaphragm being required before the maximum index value is reached.

A machine learning algorithm, for example a Kalman filter, is e.g. applied to each of the values output by the various sensors, and the data fusion algorithm forms a further index value on the basis of the measured values estimated by means of the machine learning algorithm or the Kalman filter. Using a machine learning algorithm such as a Kalman filter, a value is estimated based on a system model which simulates the system to be measured, and taking a previous measurement into account. That is, the machine learning algorithm uses a measurement value from a previous measurement to make an a priori prediction. This allows the machine learning algorithm to be used to map a snapshot of wear. If an actual measured value differs from the estimated value, this is a sign of wear of the diaphragm.

In other words, an index value based on directly measured values and an index value based on values estimated using a machine learning algorithm are formed in parallel. The two index values formed in parallel thus represent a state of the diaphragm at the same point in time. The degree of deviation can be used to estimate how fast wear is progressing.

The use of the machine learning algorithm can also contribute to reduce an influence of errors in the measured values, in particular due to noise and other disturbances.

The object is further achieved according to the disclosure by a diaphragm valve comprising a fluid housing having a valve seat formed therein, a diaphragm which cooperates with the valve seat to open or close a flow path through the fluid housing, and a movably mounted drive tappet which is attached to the diaphragm. The diaphragm valve comprises at least two sensors from the following group: a capacitive sensor which is arranged such that the diaphragm is located at least in sections in the electric field of the capacitive sensor, a temperature sensor, a pressure sensor, a force sensor, a pH sensor, a stress sensor and a vibration sensor. The diaphragm valve includes an analysis unit which is set up to calculate an index value using the measured values of the sensors in accordance with a method according to the disclosure. The diaphragm valve according to the disclosure thus has the same advantages that have already been described in connection with the method.

The temperature sensor can be set up to measure a temperature inside the diaphragm valve in the vicinity of the diaphragm and/or the pressure sensor comprises conducting tracks applied to the diaphragm and/or the force sensor is arranged on the drive tappet and/or the stress sensor comprises strain gauges arranged on or in the diaphragm and/or the vibration sensor is a magnetic sensor. All sensors thus serve to directly or indirectly determine loads on the diaphragm or stresses in the diaphragm. These stresses, which promote wear of the diaphragm, are included in the index value.

The analysis unit may be integrated in a control head of the diaphragm valve or be adapted to be connected externally to the diaphragm valve or the control head of the diaphragm valve. An integrated analysis unit has the advantage that the index value can be calculated continuously. An externally connectable analysis unit, on the other hand, has the advantage that the same analysis unit can be used to evaluate several different diaphragm valves by connecting the analysis unit successively to different diaphragm valves, if required. In this way, the costs for manufacturing the diaphragm valve can be significantly reduced.

DETAILED DESCRIPTION

Figure 1:
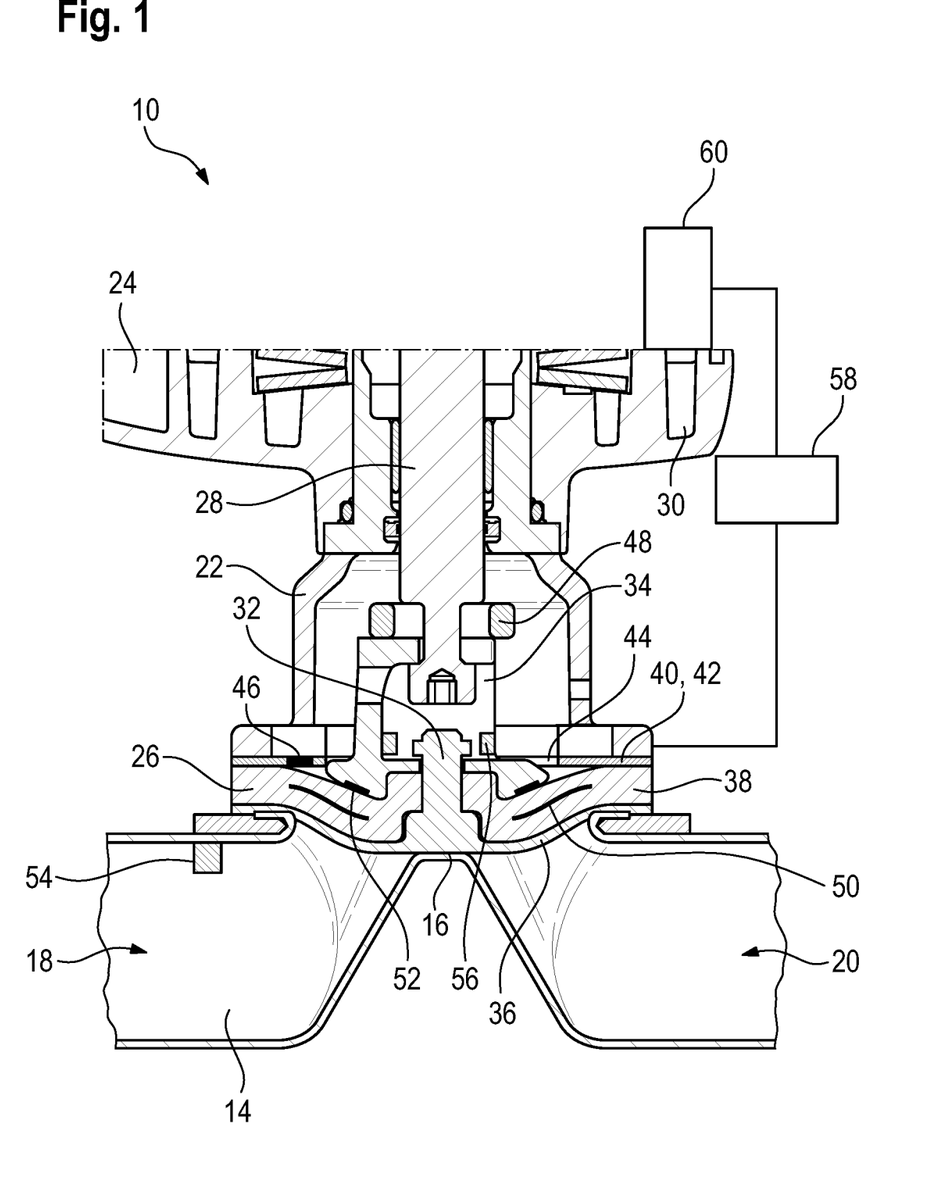
FIG. 1 shows a diaphragm valve according to the disclosure.

FIG. 1 shows part of a diaphragm valve 10 in a sectional view.

The diaphragm valve 10 has a fluid housing 14 having a valve seat 16 formed therein.

A flow path through the fluid housing 14 extends from a fluid inlet 18 to the valve seat 16 and across the latter to a fluid outlet 20.

A diaphragm base 22 of a valve housing 24 is arranged on the fluid housing 14.

The diaphragm valve 10 further comprises a diaphragm 26 which cooperates with the valve seat 16 to open or close the flow path through the fluid housing 14.

A movably mounted, in particular linearly displaceable drive tappet 28 of the diaphragm valve 10 is coupled to the diaphragm 26 such that a movement of the drive tappet 28 lifts the diaphragm 26 from the valve seat 16 or presses it against the valve seat 16.

The drive tappet 28 extends from the diaphragm 26 into a control head 30, which also houses a valve drive (not shown).

In the example embodiment, an engagement member 32 is formed on the diaphragm 26, and the drive tappet 28 engages the diaphragm 26 via the engagement member 32.

Optionally, the drive tappet 28 includes a pressure distribution element 34 to better distribute a pressure applied to the diaphragm 26 by the drive tappet 28.

In the example embodiment, the diaphragm 26 is configured as a two-layer diaphragm.

At least one of the two layers 36, 38 is e.g. made of an electrically conductive material. In particular, at least the layer 38 on the dry side of the diaphragm 26 is made of electrically conductive material.

Alternatively, the diaphragm 26 as a whole may be formed of an electrically conductive material.

For example, the conductive material is ethylene-propylene-diene monomer, other materials being however conceivable.

In the example embodiment, the engagement element 32 is formed on the layer 36 of the diaphragm 26 which faces the fluid carrying area of the diaphragm valve 10.

The diaphragm valve 10 further comprises a capacitive sensor 40.

The capacitive sensor 40 comprises a multi-layer electrode 42. The individual layers of the electrode are described in detail below with reference to FIGS. 3 to 5.

The capacitive sensor 40 is arranged such that the diaphragm 26 is located at least in sections in the electric field of the capacitive sensor 40.

Specifically, a moving area of the diaphragm 26 which is deflected when the diaphragm valve 10 is actuated is located in the electric field of the capacitive sensor 40.

The electrode 42 of the capacitive sensor 40 is arranged on the side of the diaphragm 26 facing away from the valve seat 16.

More precisely, the electrode 42 is arranged, in particular clamped between the diaphragm 26 and the diaphragm base 22 of the valve housing 24.

The deflected area of the diaphragm 26 does not touch the electrode 42. Only an unmoved edge area of the diaphragm 26 may be in contact with the electrode 42.

Since the moving area of the diaphragm 26 is located in the electric field of the capacitive sensor 40, the diaphragm 26 affects the capacitance value measured by the sensor 40.

Specifically, a deflection of the diaphragm 26 to actuate the diaphragm valve 10 affects the capacitance value, but changes in geometry or changes in material properties of the diaphragm 26 due to wear also affect the measured capacitance value.

The drive tappet 28 extends through a recess 44 in the electrode 42.

The diaphragm valve 10 also includes a temperature sensor 46 set up to measure a temperature within the diaphragm valve 10 in the vicinity of the diaphragm 26. In the example embodiment, the temperature sensor 46 is integrated into the electrode 42, in particular in the form of an RFID temperature sensor.

Furthermore, the diaphragm valve 10 comprises a force sensor 48 arranged on the drive tappet 28, in the example embodiment between the pressure distribution element 34 and the drive tappet 28. In particular, the force sensor 48 is set up to determine the force with which the drive tappet 28 acts on the diaphragm 26.

In addition, the diaphragm valve 10 comprises a stress sensor 50 in the form of strain gauges on and/or in the diaphragm 26.

The diaphragm valve 10 further comprises a pressure sensor 52 in the form of conducting tracks, particularly copper tracks, applied to the diaphragm 26. A movement of the conducting tracks relative to each other can be used to infer the pressure conditions within the diaphragm.

Furthermore, the diaphragm valve 10 comprises a pH sensor 54.

In addition, the diaphragm valve 10 comprises a vibration sensor 56. In particular, the vibration sensor 56 is attached to the drive tappet 28, more specifically to the pressure distribution element 34. The vibration sensor 56 can be used to detect vibrations of the drive tappet 28 which are transmitted to the clamped area of the diaphragm 26 and can cause cracks.

The sensors 40, 46, 48, 50, 52, 54, 56 can provide discrete-time measured values.

All sensors 40, 46, 48, 50, 52, 54, 56 can be arranged on the diaphragm 26 or in the vicinity of the diaphragm 26.

A read-out unit 58, which is only schematically illustrated in FIG. 1, serves to evaluate the values measured by the sensors 40, 46, 48, 50, 52, 54, 56.

The read-out unit 58 can be connected to the sensors 40, 46, 48, 50, 52, 54, 56 for signal purposes and is set up to read out the corresponding signals from the sensors 40, 46, 48, 50, 52, 54, 56.

The read-out unit 58 is formed, for example, by a sensor chip.

It is also conceivable that a plurality of read-out units 58 are provided.

The read-out unit 58 can send the read-out data to an analysis unit 60 provided in the control head 30, which is set up to evaluate and analyze the acquired data.

The analysis unit 60 is formed, for example, by a microcontroller chip.

However, it is also conceivable that an external analysis unit 60 is present, which can be connected to the control head 30 for evaluating the acquired data. In this case, the values detected by the sensors 40, 46, 48, 50, 52, 54, 56 are first temporarily stored in a memory unit of the diaphragm valve 10 and read out and evaluated when the analysis unit 60 is connected.

In the case of an integrated analysis unit 60, the measured values of the sensors 40, 46, 48, 50, 52, 54, 56 are continuously evaluated.

In a further alternative embodiment, the read-out unit 58 and the analysis unit 60 are formed by a single, self-contained unit.

Figure 2:
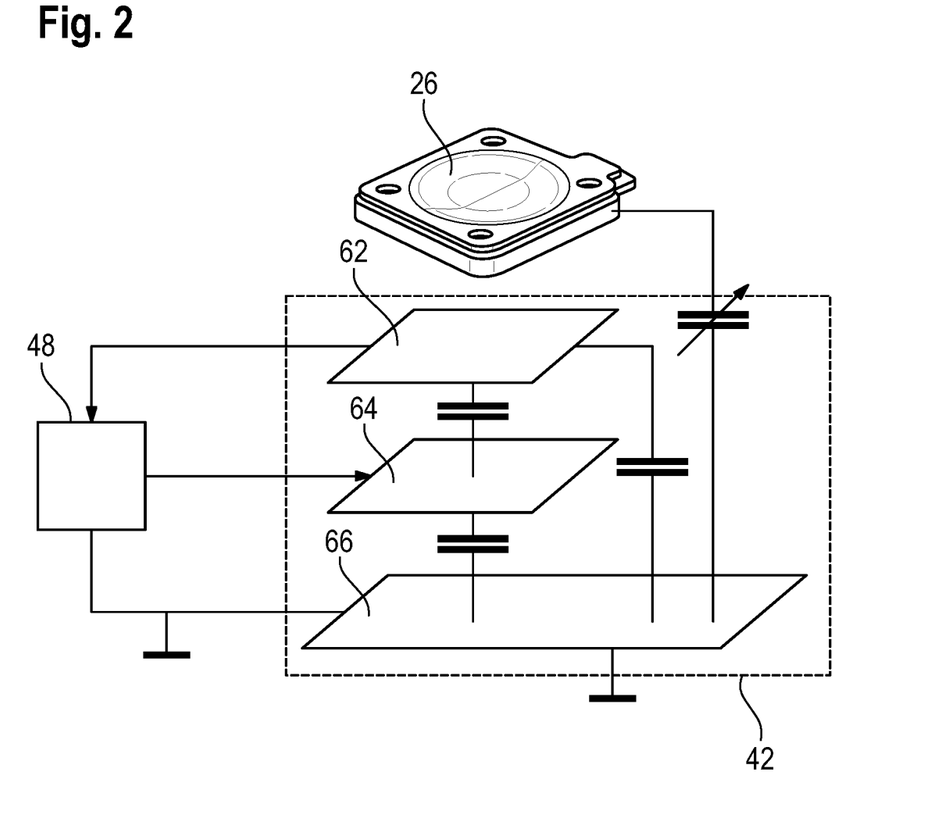
FIG. 2 shows a diagram for illustrating the measuring principle of a capacitive sensor.

In FIG. 2, a diagram illustrates a mode of operation of the capacitive sensor 40, which is basically known.

A capacitive sensor 40 operates based on the change in electrical capacitance of a single capacitor or capacitor system.

In the example embodiment, the layers of the multilayer electrode 42 form the capacitors of the capacitive sensor 40 and the diaphragm 26 forms the dielectric, so that any movement or change in the material properties of the diaphragm 26 changes the capacitance value of the sensor 40 and is detected.

Figure 3:
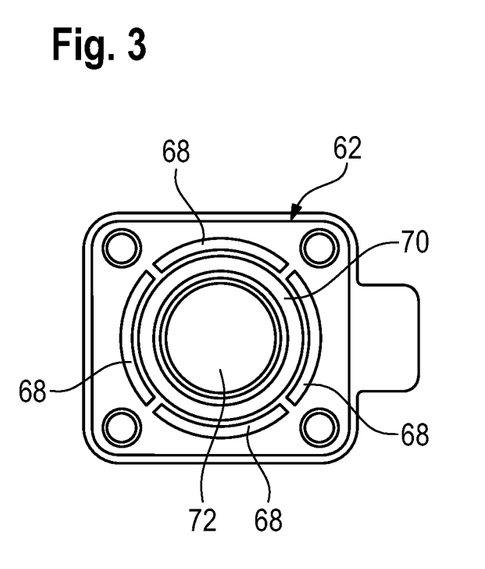
FIG. 3 shows a receiver layer of the capacitive sensor.
Figure 4:
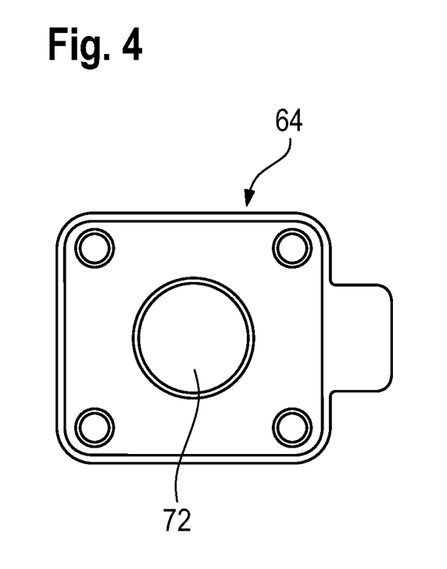
FIG. 4 shows a transmitter layer of the capacitive sensor.
Figure 5:
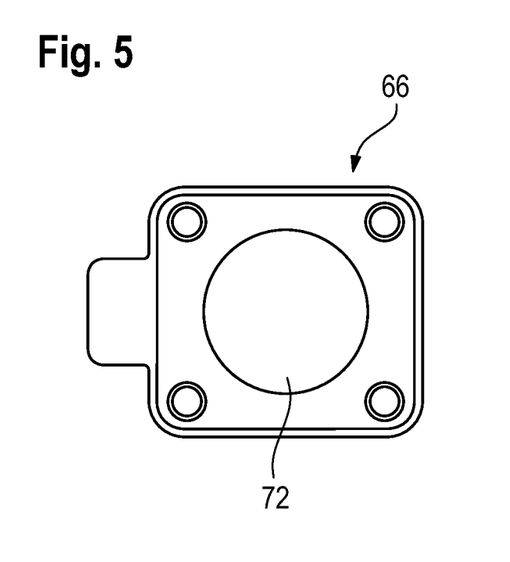
FIG. 5 shows a grounding layer of the capacitive sensor.

In particular, the electrode 42 includes a receiver layer 62, a transmitter layer 64, and a grounding layer 66, which are illustrated in FIGS. 3 to 5.

The electrode 42 may be rigid or flexible.

The diaphragm 26 and the multi-layer electrode 42 together form, in particular, a parallel-plate capacitor, the diaphragm 26 being a plate of the capacitor.

FIG. 3 shows a receiver layer 62. Four edge electrodes 68 are arranged on the receiver layer 62. A movement or change in geometry of the diaphragm 26 can be detected within the edge electrodes 68.

Additionally, an annular conducting track 70 is provided within the edge electrodes 68.

The conducting track 70 forms a receiver coil of the capacitive sensor 40.

The design of the conducting track 70 has in particular an effect on the capacitance of the capacitive sensor 40.

FIG. 4 shows a transmitter layer 64 with a large area conductive layer.

FIG. 5 shows a grounding layer 66.

All layers 62, 64, 66 have an identical recess 72 which, when the layers 62, 64, 66 are assembled, form the recess 44 of the electrode 42.

According to the disclosure, the analysis unit 60 is configured to form an index value from the measured values of the different sensors 40, 46, 48, 50, 52, 54, 56 by means of a data fusion algorithm at at least two points in time, wherein a degree of wear of the diaphragm 26 is determined based on a change in the index value.

Specifically, an initial index value reflecting a new state of the diaphragm 26 is formed when the diaphragm valve 10 is put into operation.

Subsequently formed index values are compared with the initial index value, and a degree of wear of the diaphragm 26 is determined based on a deviation of an index value from the initial index value.

According to the data fusion algorithm, the measured values of the different sensors 40, 46, 48, 50, 52, 54, 56 are included in the index value with a defined weighting.

Figure 6:
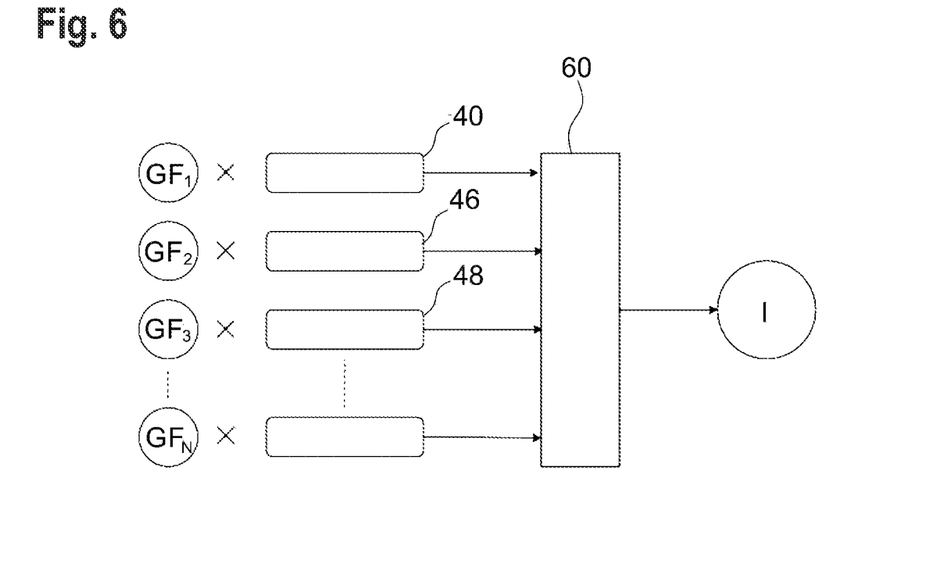
FIG. 6 shows a diagram for illustrating a calculation of an index value from the measured values of different sensors.

The calculation of the index value is described in more detail in connection with FIG. 6.

During operation of the diaphragm valve 10, the sensors 40, 46, 48, 50, 52, 54, 56 provide different measured values.

The number and types of sensors included in the calculation of the index value may vary depending on the case of application.

To form the initial index value or an index value at another point in time, the measured values of the sensors 40, 46, 48, 50, 52, 54, 56 are added up, each individual measured value being multiplied by its own weighting factor GF, and the sum of the weighted measured values being divided by the sum of the weighting factors.

Specifically, the weighted arithmetic mean of the measured values of the sensors 40, 46, 48, 50, 52, 54, 56 is first formed according to the following formula: WM=($GF_1$*(measured value capacitive sensor)+$GF_2$*(measured value temperature sensor)+$GF_3$*(measured value stress sensor)+$GF_4$*(measured value pressure sensor)+ . . . $GF_N$*(measured value sensor N))/($GF_1$+$GF_2$+$GF_3$+$GF_4$+ . . . +$GF_N$).

The sum of the weighting factors is limited to a defined value, for example to the value 1.

According to the data fusion algorithm, the weighted arithmetic mean is first formed from the measured values of the different sensors 40, 46, 48, 50, 52, 54, 56, in particular from the measured values which have been measured since the forming of the previous index value, to form an index value at a certain point in time. Subsequently, the weighted arithmetic mean is converted by the data fusion algorithm such that the index value lies in a defined range, in particular assumes one of several predetermined values.

The index values can thus be interpreted particularly easily by a user.

Indeed, the values of the weighted arithmetic mean can vary greatly depending on the diaphragm type, diaphragm size, diaphragm material and valve type. The interpretation of the obtained values can therefore be difficult for a user.

By mapping the weighted arithmetic mean to a defined range, defined and easily interpretable values can be established.

For example, the range can be defined such that the index value can take values from 1 to 10, with an index value of 1 being the initial index value immediately after replacement of the diaphragm, and an index value of 10 representing a maximum index value, replacement of the diaphragm 26 being required before the maximum index value is reached.

To map the weighted arithmetic mean to the defined range, the data fusion algorithm includes functions specific to a particular diaphragm type as well as valve type and a wear condition.

The functions corresponding to functions are determined based on tests.

Corresponding programming for performing the data fusion algorithm is stored in the analysis unit 60.

Figure 7:
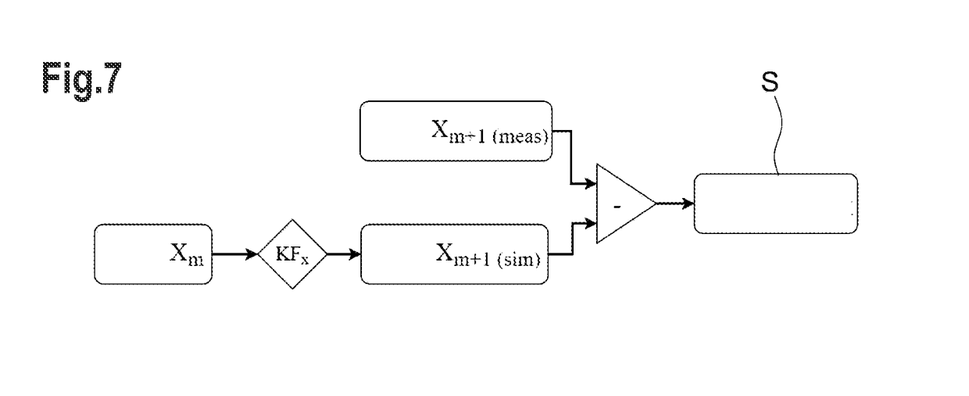
FIG. 7 shows a diagram for illustrating an adjustment of a weighting factor.

Optionally, a machine learning algorithm, for example a Kalman filter KF, is applied to each of the values output by the different sensors 40, 46, 48, 50, 52, 54, 56.

This is used, for example, to vary the weighting factors GF if required and to adapt them to a change in the performance of the diaphragm valve 10.

A corresponding way of proceeding is illustrated in FIG. 7 as an example for one sensor. However, the way of proceeding can be applied separately to all sensors 40, 46, 48, 50, 52, 54, 56.

In particular, a simulated measured value $x_{m+1(sim)}$ and a sensed measured value $x_{m+1(meas)}$ are compared with each other.

The simulated measured value $x_{m+1(sim)}$ is estimated based on a previous measured value to which a machine learning algorithm is applied, in particular a Kalman filter KF.

The sensed measured value $x_{m+1(meas)}$ and the simulated value $x_{m+1(sim)}$ thus represent a measured value at the same time.

During regular operation, the values measured by the sensors should be as far as possible constant or repeat in the same way. In this case, only a slight deviation between the sensed measured value $x_{m+1(meas)}$ and the simulated measured value $x_{m+1(sim)}$ is to be expected.

If a significant deviation of the sensed measured value $x_{m+1(meas)}$ from the regular or expected behavior is detected, this indicates an irregularity in operation, which may also cause excessive stress on the diaphragm 26.

When such a deviation occurs, the weighting factor for the corresponding sensor is increased in step S to take greater account of the deviation.

A significant deviation is, for example, a significant temperature difference, a change in pressure conditions, an increased contact force, increasing vibrations, etc.

The adjustment of the weighting factor GF is carried out, for example, automatically, in particular by the data fusion algorithm. However, it is also conceivable that a user is alerted to the deviation of the values and required to specify an adjusted weighting factor GF.

Figure 8:
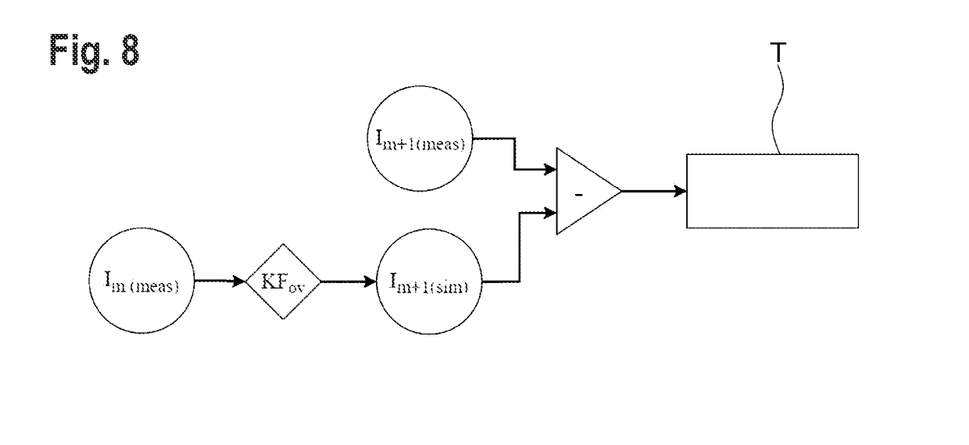
FIG. 8 shows a diagram for illustrating a plausibility check of an index value.

The index value I can be evaluated according to a similar principle. As illustrated in FIG. 8, a simulated index value $I_{m+1(sim)}$ and a measured index value $I_{m+1(meas)}$ are compared. In a subsequent step T, the difference between the simulated index value $I_{m+1(sim)}$ and the measured index value $I_{m+1(meas)}$ is analyzed.

The simulated index value $I_{m+1(sim)}$ is estimated based on a previous measured value to which a machine learning algorithm is applied, in particular a Kalman filter KF.

The measured index value $I_{m+1(meas)}$ and the simulated index value $I_{m+1(sim)}$ thus represent an index value at the same point in time.

Since the aging of the diaphragm 26 is very slow during regular operation of the diaphragm valve 10, a slight, constant difference between the measured index value $I_{m+1(meas)}$ and the simulated index value $I_{m+1(sim)}$ is to be expected. In particular, the magnitude of the difference reflects how quickly the diaphragm 26 wears out.

If a sudden, unexpectedly large difference occurs between the measured index value $I_{m+1(meas)}$ and the simulated index value $I_{m+1(sim)}$, this is indicative of a malfunction in the operation of the diaphragm valve 10, for example a malfunction of a sensor or a sudden failure of the diaphragm 26.

A non-linear equation of state or a recursive least square algorithm may be used instead of the data fusion algorithm described previously.

The invention claimed is:

1. A method of operating a diaphragm valve having a fluid housing including a valve seat formed therein, a diaphragm which cooperates with the valve seat to open or close a flow path through the fluid housing, and—at least two sensors—selected from a capacitive sensor which is arranged such that the diaphragm is located at least in sections in an electric field of the capacitive sensor, a temperature sensor, a pressure sensor, a force sensor, a pH sensor, a stress sensor and a vibration sensor, the method comprising:
forming an index value—from measured values of the different sensors by means of a data fusion algorithm at at least two points in time, and
determining a degree of wear of the diaphragm—on the basis of a change in the index value,
wherein in accordance with the data fusion algorithm, the measured values of the different sensors are included in the index value with a defined weighting,
wherein the weighting of the individual measured values is different for different cases of application, and
wherein the weighting reflects the influence of the measured value on the wear of the diaphragm.

2. The method according to claim 1, wherein the individual measured values are each multiplied by their own weighting factor, the sum of the weighting factors being limited to a defined value.

3. The method according to claim 1, wherein the weighting of individual measured values is changed in the course of operation.

4. The method according to claim 1, wherein in accordance with the data fusion algorithm, a mean value is respectively formed from the measured values of the different sensors, and the differently weighted mean values are added up to form the index value.

5. The method according to claim 1, wherein the different sensors provide discrete-time measured values.

6. The method according to claim 1, wherein when the diaphragm is replaced, an initial index value is formed which reflects a new state of the diaphragm, the index values formed later being compared with the initial index value, and a degree of wear of the diaphragm being determined on the basis of a deviation of an index value from the initial index value.

7. The method according to claim 1, wherein a machine learning algorithm—is applied to each of the values output by the various sensors, and—wherein the data fusion algorithm forms a further index value on the basis of the measured values estimated by means of the machine learning algorithm.

8. A diaphragm valve comprising:
a fluid housing having a valve seat formed therein,
a diaphragm which cooperates with the valve seat to open or close a flow path through the fluid housing,
a movably mounted drive tappet which is attached to the diaphragm,
wherein the diaphragm valve—includes at least two sensors—having a capacitive sensor which is arranged such that the diaphragm is located at least in sections in an electric field of the capacitive sensor, a temperature sensor, a pressure sensor, a force sensor, a pH sensor, a stress sensor and a vibration sensor, and
wherein the diaphragm valve includes an analysis unit which is set up to calculate an index value using the measured values of the sensors according to a method of claim 1.

9. The diaphragm valve according to claim 8, wherein the temperature sensor is set up to measure a temperature inside the diaphragm valve in the vicinity of the diaphragm and/or the pressure sensor comprises conducting tracks applied to the diaphragm and/or the force sensor is arranged on the drive tappet and/or the stress sensor comprises strain gauges arranged on or in the diaphragm and/or the vibration sensor is a magnetic sensor.

10. The diaphragm valve according to claim 8, wherein the analysis unit is integrated in a control head of the diaphragm valve or is externally connectable to the diaphragm valve or the control head of the diaphragm valve.

11. A method of operating a diaphragm valve having a fluid housing including a valve seat formed therein, a diaphragm which cooperates with the valve seat to open or close a flow path through the fluid housing, and at least two sensors selected from a capacitive sensor which is arranged such that the diaphragm is located at least in sections in an electric field of the capacitive sensor, a temperature sensor, a pressure sensor, a force sensor, a pH sensor, a stress sensor and a vibration sensor, the method comprising:
forming an index value from the measured values of the different sensors by means of a data fusion algorithm at at least two points in time, and
determining a degree of wear of the diaphragm on the basis of a change in the index value,
wherein in accordance with the data fusion algorithm, the measured values of the different sensors are included in the index value with a defined weighting, and
wherein the individual measured values are each multiplied by their own weighting factor, the sum of the weighting factors being limited to a defined value.

12. A method of operating a diaphragm valve having a fluid housing including a valve seat formed therein, a diaphragm which cooperates with the valve seat to open or close a flow path through the fluid housing, and at least two sensors selected from a capacitive sensor which is arranged such that the diaphragm is located at least in sections in an electric field of the capacitive sensor, a temperature sensor, a pressure sensor, a force sensor, a pH sensor, a stress sensor and a vibration sensor, the method comprising:
forming an index value from the measured values of the different sensors by means of a data fusion algorithm at at least two points in time, and determining a degree of wear of the diaphragm on the basis of a change in the index value, wherein in accordance with the data fusion algorithm, a mean value is respectively formed from the measured values of the different sensors, and the differently weighted mean values are added up to form the index value.

13. A method of operating a diaphragm valve having a fluid housing including a valve seat formed therein, a diaphragm which cooperates with the valve seat to open or close a flow path through the fluid housing, and at least two sensors selected from a capacitive sensor which is arranged such that the diaphragm is located at least in sections in an electric field of the capacitive sensor, a temperature sensor, a pressure sensor, a force sensor, a pH sensor, a stress sensor and a vibration sensor, the method comprising:

forming an index value from the measured values of the different sensors by means of a data fusion algorithm at at least two points in time, and determining a degree of wear of the diaphragm on the basis of a change in the index value, wherein a machine learning algorithm is applied to each of the values output by the various sensors, and wherein the data fusion algorithm forms a further index value on the basis of the measured values estimated by means of the machine learning algorithm, wherein an index value based on directly measured values and an index value based on values estimated using a machine learning algorithm are formed in parallel, and wherein the degree of deviation is used to estimate how fast wear is progressing.

* * * * *